United States Patent Office 2,758,625
Patented Aug. 14, 1956

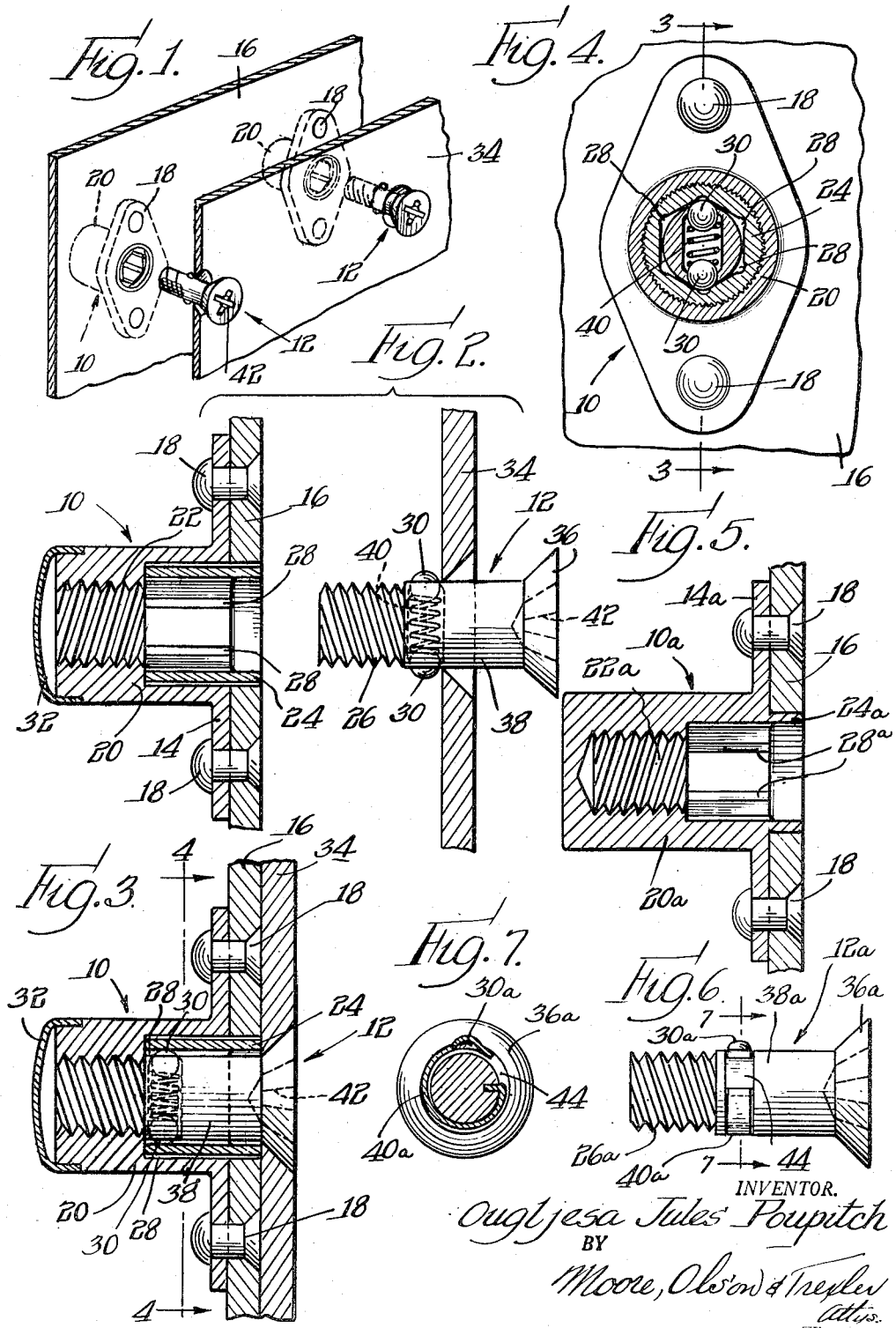

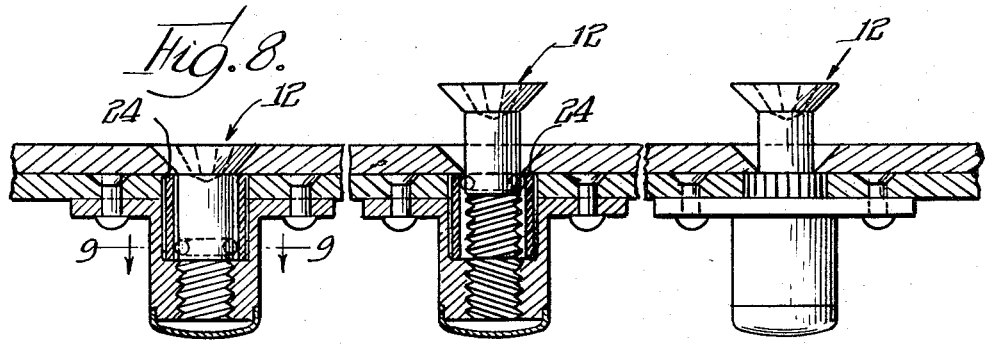
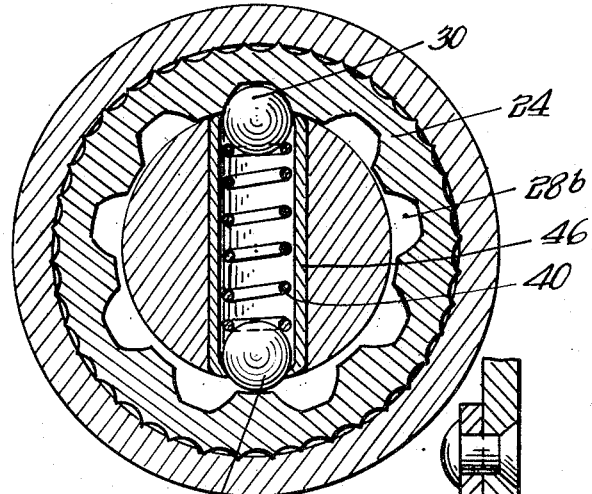
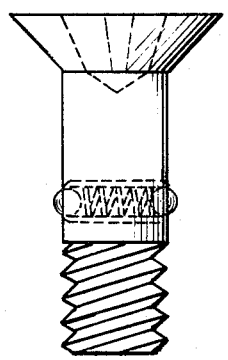
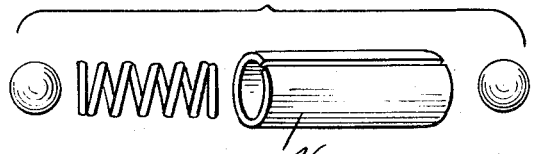
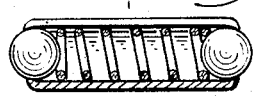
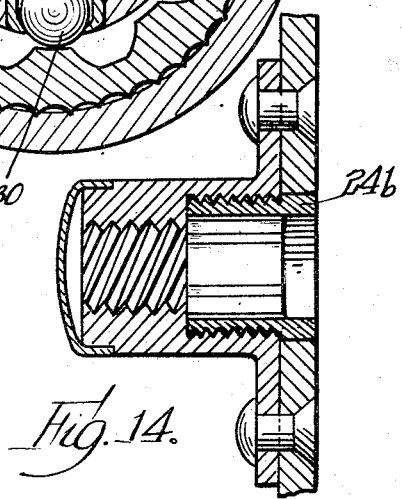
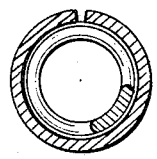
INVENTOR.
Ougljesa Jules Poupitch

2,758,625

FASTENER COMPRISING A THREADED RECEPTACLE, CO-OPERATING THREADED STUD AND SPRING DETENT LOCKING MEANS THEREON

Ougljesa Jules Poupitch, Itasca, Ill., assignor to Illinois Tool Works, Chicago, Ill., a corporation of Illinois Application December 5, 1952, Serial No. 324,228

7 Claims. (Cl. 151—6)

This invention relates generally to fasteners designed for quick assembly and disassembly of work pieces as, for example, cowling parts and the like on aircraft.

Various types of quickly operable fasteners, commonly known as cowl fasteners, have heretofore been used quite extensively in the aircraft industry to facilitate removal and application of cowling parts and the like. While these prior cowl fasteners serve their intended purpose in certain type of aircraft, modern aircraft development renders these fasteners unsatisfactory because of the introduction of relatively high stresses due to the tremendous increase in speed. The present invention contemplates the provision of a quickly operable fastener which might well be referred to as a high shear type fastener because its design is such as to withstand the higher stress conditions referred to above.

The type of fastener contemplated by the present invention incorporates two main structures, one in the form of a receptacle adapted to be applied to one side of an apertured work sheet as, for example, the inner surface of the fixed skin portion of an airplane, and the other a stud member adapted for insertion within the aperture of the detachable work piece or cowling.

More specifically, the present invention contemplates a quickly operable fastener of the type set forth above in which the stud and receptacle are secured against inadvertent loosening, and to this end the invention contemplates the provision of means in the form of an interlock between the stud and receptacle which will not impair the relative rotative association and disassociation of these parts, but will serve effectively to counteract the tendency for the stud to loosen even under the most severe conditions of vibration.

It is a further object of the present invention to provide a fastener as above set forth, wherein a fast lead screw coupling is employed in association with automatically operable detent means to prevent inadvertent loosening of the parts.

Still more specifically, the invention contemplates provision of the combination of elements of the type above referred to, wherein the number of parts is reduced to a minimum, and wherein the stud and complementary receptacle may be used repeatedly without the slightest danger of wear or structural fatigue.

A still further object of the present invention is to provide in a quickly operable fastener designed to withstand high shear stresses as set forth above, means which provides an impositive interlock between the stud and receptacle and also serves to hold the stud captive in one of the work pieces when the stud and receptacle are separated from each other.

The foregoing and other objects and advantages will be more apparent from the following detailed description when considered in connection with the accompanying drawings, wherein—

Fig. 1 is a perspective view of fragmentary sheet metal work pieces equipped with quickly operable fasteners contemplated by the present invention, one of the work pieces carrying the receptacle and the other work piece the stud element;

Fig. 2 is an enlarged vertical sectional view taken centrally through the separated work pieces of Fig. 1, more clearly to illustrate the structural details of the parts which constitute the quickly operable fastener;

Fig. 3 disclosed the apertured work pieces or sheets of Fig. 2 secured against each other by the fastener which forms the subject matter of the present invention, said view being taken substantially along the line 3—3 of Fig. 4;

Fig. 4 is a view taken substantially along the line 4—4 of Fig. 3;

Fig. 5 is a vertical sectional view of a modified one-piece form of receptacle, as distinguished from the two-piece form shown in the other figures;

Fig. 6 is a side elevational view of a modified fastener stud which is equipped with a locking spring, as distinguished from the spring-pressed balls shown in Figs. 1 to 4, inclusive;

Fig. 7 is a transverse sectional view taken substantially along the line 7—7 of Fig. 6, more clearly to illustrate the manner in which the locking spring associated with the stud of Fig. 6 will function to interlock the stud and receptacle;

Fig. 8 is a sectional view of complementary work pieces equipped with a plurality of fasteners of the type contemplated by the present invention showing the manner in which one of the fastening studs may be tightened in position while the remaining studs are preliminarily interlocked with their companion receptacles;

Fig. 9 is an enlarged transverse sectional view of a modified receptacle, the view being taken along a line corresponding with the section line 9—9 of Fig. 8;

Fig. 10 is a side elevational view of a stud equipped with a ball and spring unit, as shown in Fig. 9;

Fig. 11 is an exploded view of the four parts comprising the ball and spring unit, wherein the cylindrical retainer consists of a split sleeve;

Fig. 12 is a central sectional view of the unit shown in Fig. 11;

Fig. 13 is an enlarged transverse sectional view taken substantially along the line 13—13 of Fig. 12; and Fig. 14 is a vertical sectional view similar to Fig. 2 showing an insert which makes threaded engagement with the receptacle body, as distinguished from the externally splined or serrated inserts previously described.

Referring now to the drawing more in detail, wherein like numerals have been employed to designate similar parts throughout the various figures, it will be seen that one embodiment of the quickly operable fastener contemplated by the present invention and disclosed in Figs. 1 to 4, inclusive, is comprised generally of a receptacle designated generally by the numeral 10 and a rotary stud member designated generally by the numeral 12. The receptacle 10 includes a plate-like flange portion 14 adapted to be secured in any suitable manner to a work piece or sheet 16, as by means of rivets 18. Extending outwardly from the anchoring plate 14 is a cylindrical body portion 20 having an internal multiple thread 22, Fig. 2. The purpose of enploying a multiple thread is to provide a thread with a relatively high thread angle or fast lead to facilitate relatively fast axial association and disassociation of the stud 12 and the receptacle 10.

In the embodiment shown in Figs. 1 to 4, inclusive, the receptacle 10 carries a preferably hardened annular insert or shell 24. The insert 24 is secured by a pressed fit to the cylindrical internally threaded body 20, and in order to insure against relative rotation of the insert 24 and the body 20, serrations are provided along the outer periphery of the insert, as shown clearly in Figs. 2, 3 and 4. The internal diameter of the insert 24 is sufficiently large to accommodate freely the entering thread extremity 26 of the stud 12, and is provided with circumferentially spaced grooves 28 to accommodate spring-pressed balls 30 of the stud member 12. It will also be noted that the annular insert 24 extends beyond the plate 14 in a direction opposite from the body 20, and is designed to fit within a complementary aperture within the work piece or sheet 16. This extension of the insert 24 cooperates with the fastening elements or rivets 18 in taking up or withstanding shear stresses to which the receptacle 10 and its complementary work sheet 16 may be subjected when in use. A suitable cap 32 is frictionally carried by the outer periphery of the body 20, and this cap serves to prevent the accumulation of foreign matter within the body 20.

The rotary stud 12 is adapted to be received by a complementary aperture in a second work piece 34, as shown clearly in Fig. 2. As previously pointed out, the stud 12 includes an entering threaded shank portion 26, and interposed between the threaded portion 26 and a stud head 36 is an unthreaded shank portion 38 conforming substantially in diameter with the minimum diameter defined by the inner periphery of the insert 24. The oppositely disposed balls 30 are urged radially outwardly by a coil spring 40 housed within a complementary aperture extending transversely of the stud shank. The material defining the opposite extremities of this aperture are peened over so as to reduce the size of the aperture openings sufficiently to prevent the balls 30 from becoming separated from the stud. It will be noted that the balls 30 normally project beyond the periphery of the unthreaded shank portion 38, and thus serve to retain the stud in the work sheet 34 when the stud is detached from the receptacle 10, as shown in Fig. 2. The head 36 of the stud is provided with a screw slot 42 for accommodating a complementary turning tool, such as a screw driver blade.

The quickly operable fastener device just described has a very practical application in instances where high transverse stresses, as well as longitudinal stresses, are experienced. For example, in modern high speed aircraft the stresses to which the skin of the fuselage and wings are subjected are considerably greater than stresses experienced in slower speed aircraft. In the drawing the work sheet 16 is representative of the fixed skin portion of an airplane, and the work sheet 34 is representative of that portion of the skin which is detachable as, for example, cowling parts and the like. The rotary stud 12 is telescopically associated with the work sheet 34 by merely pushing the stud through the work aperture, thereby depressing the balls 30 sufficiently to permit them to snap through the opening. In this position the stud member is held captive within the work sheet in readiness to be applied to the complementary receptacle 10. As the entering end of the stud is rotatably brought into telescopic association with the complementary internal long lead thread 22 of the receptacle, slightly more than one complete revolution of the stud will cause the work sheets 16 and 34 to be tightened together, as shown in Fig. 3, with the stud head 36 firmly clamped against the material of the work sheet 34 which defines the aperture therein. Shortly after the engagement of the thread of the stud with the thread of the receptacle, the balls 30 are moved into frictional engagement with the internal periphery of the insert 24, and as the stud is rotated these balls will click past the longitudinal grooves 28 until the stud is finally moved to its tightened position, as illustrated in Fig. 3. The coaction or interlocking between the balls 30 and the grooves 28 counteracts effectively tendencies for the stud to loosen. Obviously, forces tending to cause retrograde rotation of the stud after it has been secured in its final tightened position are not great, but unless some resistance to rotation is experienced by the stud, the vibration to which the fastener parts and their associated work sheets are subjected when in use may have a tendency to cause the stud to become loosened.

In the embodiment shown in Figs. 1 to 4, inclusive, the inner periphery of the insert defines a hexagon in cross-section, and each corner of this hexagon is provided with a groove 28. This and other grooved arrangements of the inner periphery of the insert are contemplated to cooperate with a suitable spring-pressed latching element such as the balls 30 for securing the stud against loosening. If, perchance, the stud should loosen a slight amount, further loosening would be resisted by the next set of grooves engaged by the latching elements or balls, and the projection of the stud head 36 beyond its complementary work surface would become apparent to an observer.

Fig. 5 discloses a slightly modified receptacle designated generally by the numeral 10a. This receptacle includes a plate-like section 14a and a body portion 20a provided with internal threads 22a having a relatively large thread angle or lead, and is adapted to be secured to the plate 16 by rivets 18. The outer extremity of the cylindrical body portion 20a is closed, and therefore avoids the necessity of employing the cap 32 as shown in Figs. 2 and 3. Also, the receptacle shown in Fig. 5 is not provided with an insert, such as the insert 24 of the receptacle 10, but is formed with an integral annular extension 24a adapted to be received by the opening within the work piece or sheet 16. The inner periphery of the opening within the receptacle 10 in the vicinity of the annular projection 24a is provided with longitudinal splines or grooves 28a which function similarly to the previously described grooves 28.

In Figs. 6 and 7 a modified stud 12a is shown. This stud is similar to the stud 12 in that it is provided with a threaded entering end 26a, a head 36a and an unthreaded shank portion 38a. The stud 12a differs from the stud 12 in the use of an encircling spiral spring 40a secured at one extremity to the stud shank within an annular groove 44, Fig. 7, the opposite free extremity thereof presenting a spring-pressed abutment or latching means 30a which functions similarly to the previously described spring-pressed balls 30. The normal position occupied by the latching protuberance 30a is that shown in Fig. 7, in which position it projects beyond the periphery of the threaded and unthreaded portions of the stud shank. When applied to a complementary receptacle it functions similarly to the previously described stud member 12.

In Fig. 8 the work pieces of Fig. 1 are shown in section and are equipped with a plurality of fastener devices as shown in Figs. 1 to 4, inclusive. The purpose of disclosing a plurality of these fastening devices is to illustrate the manner in which one of the stud members 12, shown at the left, may be driven home to its tightened position while the two remaining stud members are partially inserted awaiting tightening within the receptacle. It will be seen from the section shown in the center portion of Fig. 8 that this preliminary association of the studs with their complementary receptacles permits an interlocking of the balls 30 with their complementary grooves in the sleeve 24. In this position the studs are temporarily maintained in coaxial alignment with the internally threaded portion of the receptacle body. This is to be distinguished, for example, from conventional cowl fastener studs equipped with cross-pins. In using such studs extreme care must be exercised to prevent the cross-pin from becoming lodged between adjacent surfaces of the work pieces while one of the studs is being rotated into locking position. By use of applicant's device a simple pushing operation assures preliminary and predetermined positioning of the studs within their respective receptacles in readiness to be tightened. It is of particular importance that the latching elements or balls 24 interlock with their respective splines or grooves in the receptacle before there is any thread engagement between the external stud thread and the internal thread of the receptacle. In this manner the work sheets or panels may be drawn flush by sequentially tightening the stud members after they have been preliminarily positioned as described without any danger of distorting the panels or causing any interference which might obstruct flush engagement of the work surfaces.

In Figs. 9 and 10 a slightly modified stud and receptacle structure is shown. It will be noted that the insert 24 is provided with a plurality of serrations 28b which differ from the serrations 28 and 28a in that the serrations or grooves 28b are odd in number. This reduces the degree of relative rotation between the insert and the stud necessary to bring about registration of at least one of the balls with the grooves in the sleeve. It will also be noted that the stud of Figs. 9 and 10 is equipped with a self-contained ball and spring unit, wherein the balls 30 and the coiled spring 40 are held together as a unit by a sleeve 46 which is peened over at each extremity so as to prevent dislodgement of the balls 30 therefrom. This sleeve 46 is adapted to make a tight frictional fit within the stud shank.

In Fig. 11 a slightly modified sleeve 46a is shown, the sleeve 46a being a severed sleeve as distinguished from the tubular construction of the sleeve 46. In Fig. 14 a slightly modified insert 24b is shown having external thread convolutions engaging complementary internal thread convolutions within the receptacle body. In other words, the sleeve 24b is secured by threads within the receptacle body, whereas the sleeve or insert 24 previously described is secured by means of teeth or splines driven into association with the wall defining the recess in the receptacle.

From the foregoing it will be apparent that the present invention contemplates a quickly operable fastener device which will withstand severe shear stresses. In fact, the shear stress, both in the receptacle employing the annular insert illustrated in Figs. 1 to 4, inclusive, as well as the one-piece receptacle of Fig. 5, is absorbed to a large extent by the portion of the receptacle extending within the aperture of the fixed work piece 16 and not by the stud alone. The fact that the stud member may be associated with the apertured attachable work piece 34 by mere longitudinal insertion, as distinguished from the conventional cross-pin arrangement which either requires a large aperture to permit tilting of the stud shank or the insertion of the cross-pin after insertion of the stud within the work aperture, makes for simplicity and speed of assembly. Furthermore, by providing the spring-pressed locking means within the stud shank portion of largest diameter, namely, the unthreaded portion thereof, reduces to a minimum the loss of strength due to stock removal. Also, by having a receptacle of the type contemplated by the present invention, together with the threaded extremity of the studs conforming substantially in diameter with the internal diameter of the mouth of the receptacle, makes it possible to initially insert all of the threaded extremities of the stud within a plurality of apertures, thus temporarily holding the cowling in its initial preattached position. After the stud extremities have thus been telescopically associated with their complementary receptacles, a suitable turning tool (such as a screw driver) may be applied to the stud members so as to cause engagement of the complementary screw threads. The frictional resistance established by contact of the spring-pressed latching means with the inner surface of the unthreaded receptacle mouth assures against inadvertent retrograde rotation of the stud member after it has once been driven home.

The latching members such as the balls 30 and the spring-pressed protuberance 30a serve in the nature of ratchet means to prevent unauthorized retrograde rotation of the stud shank. Attention is directed to the fact that the threaded portion of the stud and the complementary internal threaded portion of the receptacle are uninterrupted, and thus present full thread engagement throughout their axial extent. This affords the ultimate in strength to resist forces acting longitudinally of the stud axis tending to separate the parts.

Obviously, for purposes of disclosure specific forms of the quickly operable fastener device contemplated by the present invention have been shown, as well as a specific form of application in use. However, other modifications and changes are contemplated without departing from the spirit and scope of the present invention.

The invention is hereby claimed as follows:

1. A quick fastener device for removably retaining a first apertured workpiece at one side of a second apertured workpiece comprising a stud accommodating receptacle including an internally threaded body portion and an attachment end portion, flange means extending laterally from said attachment end portion and spaced axially from said body portion and adapted to be secured to the second workpiece at a side thereof opposite from said one side, said attachment portion having a counterbore of predetermined axial length extending from said flange means toward said body portion, annular means carried by said attachment portion and extending axially a predetermined length from said flange means away from said body portion for entering the second workpiece aperture when the receptacle is applied to the second workpiece for absorbing any shear stresses directed transversely of the axis of the receptacle, a rotary stud member having a head and a shank removably connectable with said receptacle for retaining the first workpiece, said shank having an external thread cooperable with the body portion, recess means providing recesses extending axially in said counterbore substantially to said body portion, spring biased latch means on said shank cooperable with recess means when the stud member is applied to the receptacle, said latch means being axially spaced from said head a distance at least substantially as great as the total of said predetermined length of said counterbore and said annular means so as to position the latch means adjacent said body portion when the stud member is fully applied, and said latch means being axially spaced from an entering end of a stud thread a distance not greater than an operative axial length of said recess means so that the latch means may be in engagement with said recess means while the shank thread is out of connecting engagement with said body portion during assembly of the shank with and removable of the shank from the receptacle.

2. A fastener device as set forth in claim 1, wherein the receptacle body and stud member are provided with a thread having a relatively long lead to facilitate quick telescopic association of the stud and receptacle with a minimum degree of stud rotation.

3. A fastener device as set forth in claim 2, wherein the long lead thread consists of a multiple thread in the receptacle and stud to afford an increase in strength when the parts are in fastened position.

4. A fastener device as set forth in claim 1, wherein the axial extent of the threaded portion of the stud is not greater than the axial extent of the counterbored portion of the body, by having the spring biased latch means arranged to interlock with the recesses in the receptacle to enable interlocking of the stud and receptacle before thread engagement of the parts.

5. A fastener device as set forth in claim 1, wherein the spring-pressed latching means carried by the stud includes a pair of diametrically disposed spring-actuated elements.

6. A fastener device as set forth in claim 1, wherein the spring-pressed latching means includes a spring element peripherally encircling the stud with the free extremity thereof normally projecting beyond the periphery of the unthreaded stud portion.

7. A fastener device as set forth in claim 5, wherein the axially extending recesses in said receptacle are odd in number.

(References on following page)

References Cited in the file of this patent

UNITED STATES PATENTS

| | | |
|---|---|---|
| 599,783 | Hagan | Mar. 1, 1898 |
| 1,434,558 | Merryman | Nov. 7, 1922 |
| 1,579,359 | Hallenbeck | Apr. 6, 1926 |
| 1,711,861 | Stallard | May 7, 1929 |
| 1,854,048 | Lauster | Apr. 12, 1932 |
| 2,225,128 | Osborn | Dec. 12, 1940 |
| 2,338,333 | Jenkins | Jan. 4, 1944 |
| 2,380,240 | Hufferd | July 10, 1945 |
| 2,390,173 | Richey | Dec. 4, 1945 |
| 2,433,138 | Marcell | Dec. 23, 1947 |
| 2,479,992 | Woods | Aug. 23, 1949 |

FOREIGN PATENTS

| | | |
|---|---|---|
| 34,856 | Denmark | Aug. 10, 1925 |
| 104,150 | Great Britain | Feb. 22, 1917 |
| 204,180 | Great Britain | Sept. 27, 1923 |
| 418,914 | Great Britain | Nov. 2, 1934 |
| 588,215 | Great Britain | May 16, 1947 |